United States Patent
Lin et al.

(10) Patent No.: US 9,525,890 B2
(45) Date of Patent: Dec. 20, 2016

(54) METHOD AND APPARATUS FOR DECODING FOR AVS SYSTEM USING FETCHING FLAG

(71) Applicant: MStar Semiconductor, Inc., Hsinchu Hsien (TW)

(72) Inventors: He-Yuan Lin, Hsinchu County (TW); Yi-Shin Tung, Hsinchu County (TW)

(73) Assignee: MSTAR SEMICONDUCTOR, INC., Hsinchu (TW)

( * ) Notice: Subject to any disclaimer, the term of this patent is extended or adjusted under 35 U.S.C. 154(b) by 342 days.

(21) Appl. No.: 14/307,941

(22) Filed: Jun. 18, 2014

(65) Prior Publication Data

US 2014/0376610 A1    Dec. 25, 2014

(30) Foreign Application Priority Data

Jun. 19, 2013  (TW) .............................. 102121716 A
Aug. 2, 2013   (TW) .............................. 102127847 A

(51) Int. Cl.
*H04N 19/13*   (2014.01)
*H04N 19/91*   (2014.01)

(52) U.S. Cl.
CPC ................................... *H04N 19/91* (2014.11)

(58) Field of Classification Search
CPC .................................................... H04N 19/91
See application file for complete search history.

(56) References Cited

U.S. PATENT DOCUMENTS

| | | | | |
|---|---|---|---|---|
| 4,313,158 A * | 1/1982 | Porter | ................ | G06F 12/0859 |
| | | | | 711/140 |
| 5,500,949 A * | 3/1996 | Saito | ....................... | G06F 21/79 |
| | | | | 365/195 |
| 2002/0169022 A1* | 11/2002 | Canterbury | ......... | G06F 12/1433 |
| | | | | 463/29 |
| 2003/0210623 A1* | 11/2003 | Fukuchi | ................ | G11B 19/02 |
| | | | | 369/47.31 |
| 2003/0221069 A1* | 11/2003 | Azevedo | ............. | G06F 12/0862 |
| | | | | 711/136 |
| 2004/0006671 A1* | 1/2004 | Handgen | ............... | G06F 13/161 |
| | | | | 711/137 |
| 2007/0285286 A1* | 12/2007 | Hussain | .............. | H03M 7/4006 |
| | | | | 341/50 |
| 2008/0240597 A1* | 10/2008 | He | ......................... | H04N 19/91 |
| | | | | 382/247 |
| 2009/0089549 A1* | 4/2009 | Liu | ..................... | H03M 7/4006 |
| | | | | 712/208 |

(Continued)

*Primary Examiner* — Jay Patel
*Assistant Examiner* — Joseph Suh
(74) *Attorney, Agent, or Firm* — WPAT, PC; Justin King

(57) ABSTRACT

A decoding method for an audio video coding standard (AVS) system is provided. According to a stop-fetching criterion, a stop-fetching flag is set to an enabled status or a disabled status. In an offset fetching procedure, it is determined whether an offset value is smaller than a threshold and whether the stop-fetching is in the disabled status. When a determination result is affirmative, one subsequent bit is fetched for the offset value, an offset shift value is correspondingly increased, and the determination step is iterated. When the determination result is negative, the offset fetching procedure is terminated. Next, it is determined whether a decoding result is a least probable symbol (LPS) or a most probable symbol (MPS).

34 Claims, 9 Drawing Sheets

(56) References Cited

U.S. PATENT DOCUMENTS

| | | | |
|---|---|---|---|
| 2009/0196355 A1* | 8/2009 | Kao | H04N 19/91 |
| | | | 375/240.25 |
| 2010/0054385 A1* | 3/2010 | Chien | H04J 3/0632 |
| | | | 375/372 |
| 2010/0177983 A1* | 7/2010 | Hsu | H04N 19/172 |
| | | | 382/268 |
| 2012/0149346 A1* | 6/2012 | Akhtar | G06F 17/30902 |
| | | | 455/414.2 |
| 2012/0287295 A1* | 11/2012 | Oota | H04N 5/144 |
| | | | 348/208.99 |
| 2014/0376610 A1* | 12/2014 | Lin | H04N 19/91 |
| | | | 375/240.02 |

\* cited by examiner

```
if ( contextWeighting == 1 ) {
    if ( ctx1->mps == ctx2->mps ) {
        predMps = ctx1->mps
        lgPmps = (ctx1->lgPmps + ctx2->lgPmps) / 2
    }
    else {
        if ( ctx1->lgPmps < ctx2->lgPmps ) {
            predMps = ctx1->mps
            lgPmps = 1023 - ((ctx2->lgPmps – ctx1->lgPmps) >> 1)
        }
        else {
            predMps = ctx2->mps
            lgPmps = 1023 - ((ctx1->lgPmps – ctx2->lgPmps) >> 1)
        }
    }
}
else {
    predMps = ctx->mps
    lgPmps = ctx->lgPmps
}
```
⎫
⎬ 11
⎭

```
if ( rT1 >= (lgPmps >> 2) ) {
    rS2 = rS1
    rT2 = rT1 - (lgPmps >> 2 )
    sFlag = 0
}
else {
    rS2 = rS1 + 1
    rT2 = 256 + rT1 - (lgPmps >> 2)
    sFlag = 1
}
```
⎫
⎬ 12
⎭

FIG. 1A(prior art)

```
if( rS2 > valueS || (rS2 == valueS && valueT >= rT2) ) {
    binVal = ! predMps
    if ( sFlag == 0 )
        tRlps = lgPmps >> 2
    else
        tRlps = rT1 + (lgPmps >> 2)
    if ( rS2 == valueS )
        valueT = valueT - rT2
    else
        valueT = 256 + ((valueT << 1 ) | read_bits(1)) - rT2    ⎫
                                                                ⎬ 13 while ( tRlps < 0x100 ) {                                   ⎫
        tRlps = tRlps << 1
        valueT = (valueT << 1 ) | read_bits(1)
    }
    rS1 = 0
    rT1 = tRlps & 0xFF
    valueS = 0                                                  ⎬ 14 while ( valueT < 0x100 ) {                                  ⎫
        valueS++
        valueT = (valueT << 1 ) | read_bits(1)
    }
    valueT = valueT & 0xFF                                      ⎬ 15
}
else {
    binVal = predMps
    rS1 = rS2
    rT1 = rT2                                                   ⎬ 16
} if ( contextWeighting == 1 ) {
    ctx1 = update_ctx(binVal, ctx1)
    ctx2 = update_ctx(binVal, ctx2)
}
else
    ctx = update_ctx(binVal, ctx)                               ⎬ 17
return (binVal)
```

FIG. 1B(prior art)

METHOD AND APPARATUS FOR DECODING FOR AVS SYSTEM USING FETCHING FLAG

This application claims the benefit of Taiwan application Serial No. 102121716, filed Jun. 19, 2013, and the benefit of Taiwan application Serial No. 102127847, filed Aug. 2, 2013, the subject matters of which are incorporated herein by reference.

BACKGROUND OF THE INVENTION

Field of the Invention

The invention relates in general to a multimedia signal processing technology, and more particularly, to a decompression technology for the audio video coding standard (AVS).

Description of the Related Art

Digital television broadcasting has matured and become prevalent with the ever-improving communication technologies. In addition to being transmitted through cables, digital television signals may be propagated in form of wireless signals via base stations or artificial satellites. To satisfy demands on enhanced image quality and reduced transmission data amount, a transmitting end usually encodes and decompresses audio/video signals to be transmitted. Correspondingly, a receiving end needs to correctly decode and decompress the received signals in order to restore the audio/video signals.

The audio video coding standard (AVS) prevalent in the Mainland China adopts advanced entropy coding to process audio/video data. Implementation details of this technique can be referred from the U.S. Pat. No. 7,808,406 and technical documentations provided by the AVS team. Such solution significantly increases the audio/video compression efficiency. According to specifications of current AVS technical documentations, a binary arithmetic coding engine at the receiving end needs to perform a decoding procedure according to pseudo codes shown in FIG. 1(A) and FIG. 1(B). The procedure may be represented as flowcharts depicted in FIG. 2(A) and FIG. 2(B). As known to one person having ordinary skill in the art, the binary arithmetic coding is an iterative process having an input referred to as an offset. By identifying a corresponding relationship between sizes of the offset and a range, it can be determined whether a current symbol to be decoded is a most probable symbol (MPS) or a least probable symbol (LPS).

In the decoding process shown in FIG. 2(A) and FIG. 2(B), two main variables associated with the range are a range shift value (denoted as rS1 and rS2 in the pseudo codes in FIG. 1(A) and FIG. 1(B), where rS1 represents an original input value and rS2 represents an updated value), and a valid range value (denoted as rT1 and rT2 in the pseudo codes, where rT1 represents an original input value and rT2 represents an updated value). Two main variables associated with the offset are an offset shift value (denoted as valueS in the pseudo codes) and a valid offset value (denoted as valueT in the pseudo codes). In practice, a data length that an arithmetic coding engine is capable of processing is limited. Specified by current AVS technical documentations, an arithmetic coding engine is required to set both of the range shift value and the valid range value to 8 binary bits. On the other hand, the offset shift value and the valid offset value need to be set to 32 binary bits and 9 binary bits, respectively. Further, in the pseudo codes in FIG. 1(A) and FIG. 1(B), a probability of the MPS is denoted as lgPmps. The range of the LPS is denoted as tRlps. The denotation sFlag represents a determination flag.

A pseudo code section 11 in FIG. 1(A), corresponding to step S201, provides a main function of fetching a last updated context model of a previous decoding procedure, accordingly determines whether the MPS is "0" or "1" in a current decoding procedure, and further determines the probability of the MPS. A pseudo code section 12 in FIG. 1(A), corresponding to step S202, is depicted in detail as sub-steps S202A to S202G in FIG. 3(A). A main function of step S202 is to update the range shift value and the valid range value according to an old range and the probability of the MPS, and to determine whether the determination flag is "0" or "1".

A pseudo code section 13 in FIG. 1(B) corresponds to steps S203 to S210. When: 1) the range shift value is greater than the offset shift value, or 2) the range shift value is equal to the offset shift value and the valid offset value is greater than or equal to the valid range value, subsequent steps S204 to S219 are performed. When a determination result of step S203 is affirmative, it means that a decoding result to be outputted by the current decoding procedure is an LPS. A main function of steps S205 to S210 is to determine an LPS range value and the valid offset value. A pseudo code section 14 in FIG. 1(B), corresponding to steps S211 to S215, perform a main function of renormalization to render the LPS range value to be greater than or equal to 256. Meanwhile, the content of the valid offset value is correspondingly adjusted. A pseudo code section 15 in FIG. 1(B), corresponding to steps S216 to S218, provide a main function of pre-fetching a subsequent offset for the use of a next round of decoding procedure. According to specifications of current AVS technical documentations, given it is determined that the current valid offset value is smaller than 256, the pre-fetching step S217 is iterated to continue accumulating the offset shift value.

When the determination result of step S203 is negative, it means that the decoding result to be outputted by the current decoding procedure is an MPS. A pseudo code section 16 in FIG. 1(B), corresponding to step S291, performs a main function of setting the decoding result as an MPS. Step S292 and step S219 in FIG. 2(B), both corresponding to a pseudo code section 17 in FIG. 1(B), serve a main function of updating the context model and feeding back the decoding result.

In the above decoding procedure, the pseudo code section 15 corresponding to the pre-fetching steps S216 to S218 contain certain drawbacks to be described below. In step S203 in FIG. 1(A), the offset shift value and the range shift value are compared with each other. When the offset shift value is greater than the range shift value, steps S291 and S292 are performed. As previously stated, the length of the offset shift value is set to 32 bits, and the length of the range shift value is set to 8 bits. In other words, theoretically, a maximum value of the offset shift value may reach as high as $(2^{32}-1)$, whereas a maximum value of the range shift value can reach only $(2^8-1=255)$. According to the decoding procedure in FIG. 2(A) to FIG. 2(B) and FIG. 3(A), only when the offset shift value does not exceed 254, the range shift value can then catch up with the offset shift value via step S202E to maintain a consistent comparison basis for the valid offset value and the valid range value. However, a currently known offset inputted into an arithmetic coding engine of a receiving end may be more than 254 continuous bit "0", in a way that the pre-fetching step S217 is repeatedly performed for over 254 times and the offset shift value is accumulated to a value higher than 254. It should be noted that, as shown in FIG. 2(A) and FIG. 2(B), only when the determination result of step S203 is affirmative, step S215 of resetting the offset shift value to zero can then be performed. As it is impossible that the range shift value be higher than the offset shift value that is accumulated to a value higher than 255, the determination result of step S203 constantly remains negative. In practice, when the offset shift value exceeds 254, the entire decoding procedure may collapse and an erroneous decoding result is outputted.

The same situation may also occur in an initialization procedure of 2the offset shift value and the valid offset value in FIG. 3(B). Comparing FIG. 3(B) and FIG. 2(B), it is observed that steps S303 to S305 are identical to the pre-fetching steps S216 to S218. That is to say, it is also possible that the offset shift value be accumulated to higher than 254, resulting in the above issue of a collapsed decoding process.

The current bit pre-fetching solution further suffers from other drawbacks. As shown in FIG. 2(B), once having entered step S216, steps S216 and S217 are iterated until the determination result of step S216 is negative. In practice, a circuit that performs step S217 may fetch subsequent offsets from an external memory or a front-end circuit via a bus. When the bus, the external memory or the front-end circuit is in a busy status (e.g., when its utilization permission is occupied by other circuits), the circuit that performs step S217 needs to wait. If the wait period gets too long, the entire decoding procedure inevitably comes to a standstill at step S217 and cannot be further performed, leading to degraded performance of an AVS decoding end.

SUMMARY OF THE INVENTION

The invention is directed to a decoding method and decoding apparatus for an audio video coding standard (AVS) system. By appropriately setting a stop-fetching flag for an offset fetching procedure, the decoding method and decoding apparatus of the present invention are capable of effectively preventing an offset shift value from being higher than a range shift value, so as to further eliminate the issue of a collapsed decoding process. Further, with the stop-fetching flag, the decoding method and decoding apparatus of the present invention are also capable of preventing the issue of the decoding procedure staying at a pre-fetching step as in the prior art, thereby enhancing the overall operation efficiency of an AVS receiving end. Not only the approach of the present poses no undesirable effect on the decoding accuracy but also reduces hardware costs. It should be noted that, when adopting the decoding method and decoding apparatus of the present invention, the decoding result outputted by an AVS encoding end need not apply an associated preventive criterion (e.g., a criterion that prohibits more than 254 bit "0" from occurring in the offset) on the outputted decoding result, i.e., the size of a buffer for storing the range shift value in an AVS decoding end need not be modified.

According to an embodiment of the present invention, a decoding method for an AVS system is provided. According to at least one stop-fetching criterion, a stop-fetching flag is set to an enabled or disabled status. In an offset fetching procedure, the decoding method performs a determination step that determines whether a valid offset value is smaller than a threshold and whether the stop-fetching flag is in the disabled status. When a result of the determination step is affirmative, the decoding method performs a fetching step to fetch a subsequent bit for the valid offset value. Further, an offset shift value is correspondingly increased, and the determination step is iterated. When the result of the determination step is negative, the offset fetching procedure is terminated. After the offset fetching procedure is terminated, it is determined whether a decoding result is a least probable symbol (LPS) or a most probable symbol (MPS).

According to another embodiment of the present invention, a decoding apparatus for an AVS system is provided. The decoding apparatus includes a stop-fetching flag setting module, a first determining module, a second determining module, a fetching module and a decoding module. The stop-fetching flat setting module sets a stop-fetching flag to an enabled status or a disabled status according to at least one stop-fetching criterion. In an offset fetching procedure, the first determining module determines whether a valid offset value is smaller than a threshold, and the second determining module determines whether the stop-fetching flag is in the disabled status. When determination results of both of the first determining module and the second determining module are affirmative, the fetching module fetches a subsequent bit for the valid offset value, correspondingly increases an offset shift value, and controls the first determining module and the second determining module to perform respective determination procedures. When the determination result of either of the first determining module and the second determining module is negative, the fetching module terminates the offset fetching procedure. After the offset fetching procedure is terminated, the decoding module determines whether a decoding result is an LPS or an MPS.

According to another embodiment of the present invention, a non-transient computer-readable storage medium for an AVS system is provided. The non-transient computer-readable storage medium stores a program code that is readable and executable by a processor. The program code is associated with a decoding procedure. A first program code sets a stop-fetching flag to an enabled status or a disabled status according to at least one stop-fetching criterion. In an offset fetching procedure, a second program code controls the processor to determine whether a valid offset value is smaller than a threshold and whether the stop-fetching flag is in the disabled status. When a determination result after executing the second program code is affirmative, a third program code controls the processor to fetch a subsequent bit for the valid offset value, to correspondingly increase an offset shift value, and to again execute the second program code. When the determination result after executing the second program code is negative, a fourth program code controls the processor to terminate the offset fetching procedure. After the offset fetching procedure is terminated, a fifth program code determines whether a decoding result is an LPS or an MPS.

According to another embodiment of the present invention, a decoding apparatus for an AVS system is provided. In an offset fetching procedure, a shift value upper limit flag is set to a first status or a second status according to a corresponding relationship between an offset shift value and a threshold. A continue-fetching flag is set to an enabled status or a disabled status according to at least one continue-fetching criterion. According to the offset shift value and the valid offset value, it is determined whether a decoding result is an LPS or an MPS. When it is determined that the decoding result is the MPS, the decoding method performs a determination step to determine whether the shift value upper limit flag is in the second status and whether the continue-fetching flag is in the enabled status. When a determination result of the determination step is affirmative, the offset shift value is updated to a result of subtracting a range shift value from the offset shift value, the range shift value is set to zero, and the offset fetching procedure is performed.

According to another embodiment of the present invention, a decoding apparatus for an AVS system is provided. The decoding apparatus includes a shift value upper limit flag setting module, a continue-fetching flag setting module, a decoding module, an offset fetching module, a determining module and a resetting module. In an offset fetching procedure, the shift value upper limit flag setting module sets an offset upper limit flag to a first status or a second status according to a corresponding relationship between an offset shift value and a threshold. The continue-fetching flag setting module sets a continue-fetching flag to an enabled status or a disabled status according to at least one continue-fetching criterion. The decoding module determines whether a decoding result is an LPS or an MPS. The offset fetching module performs the offset fetching procedure. When it is determined that the decoding result is the MPS, the determining module determines whether the shift value upper limit flag is in the second status and whether the continue-fetching flag is in the enabled status. When a determination result of the determining module is affirmative, the resetting module updates the offset shift value to be equal to a result of subtracting a range shift value from the offset shift value, sets the range shift value to zero, and controls the offset fetching module to perform the offset fetching procedure.

According to another embodiment of the present invention, a non-transient computer-readable storage medium for an AVS system is provided. The non-transient computer-readable storage medium stores a program code that is readable and executable by a processor. The program code is associated with a decoding procedure. In an offset fetching procedure, a first program code sets an offset upper limit flag to a first status or a second status according to a corresponding relationship between an offset shift value and a threshold. A second program code sets a continue-fetching flag to an enabled status or a disabled status according to at least one continue-fetching criterion. A third program code determines whether a decoding result is an LPS or an MPS according to the offset shift value and the valid offset value. When it is determined that the decoding result is the MPS, a fourth program code determines whether the offset upper limit flag is in the second status and whether the continue-fetching flag is in the enabled status. When a determination result of the fourth program code is affirmative, a fifth program code updates the offset shift value to be equal to a result of subtracting a range shift value from the offset shift value, sets the range shift value to zero, and performs the offset fetching procedure.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 1(A) and FIG. 1(B) shows pseudo codes in a decoding procedure specified by current AVS technical documentations;

DETAILED DESCRIPTION OF THE INVENTION

Figure 2A:
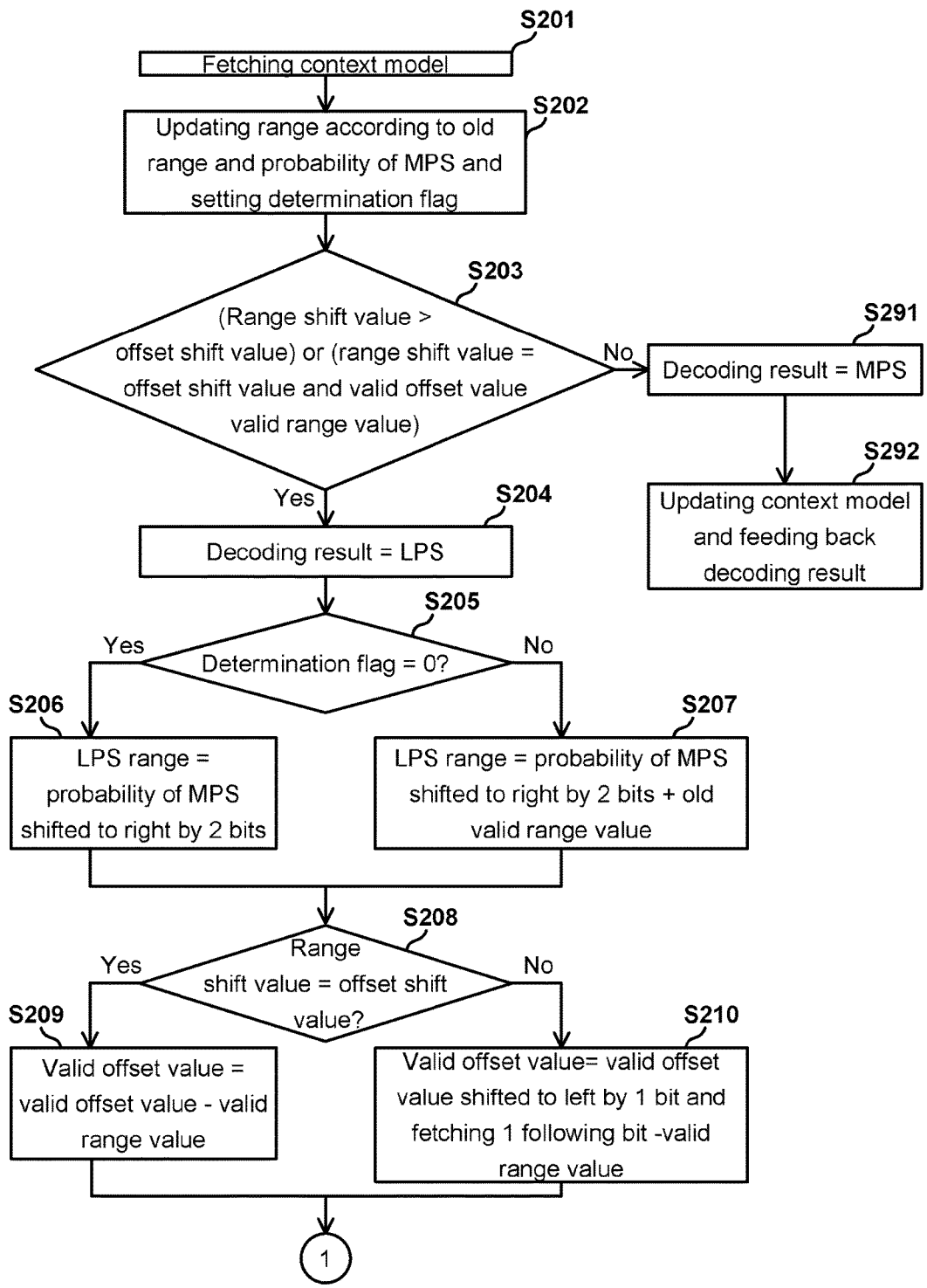
FIG. 2(A) and FIG. 2(B) are a flowchart of a decoding method corresponding to the pseudo codes in FIG. 1(A) and FIG. 1(B)

A decoding method for an audio video coding standard (AVS) system is provided according to an embodiment of the present invention. In the description below, it is assumed that lengths of a range shift value, a valid range value, an offset shift value and an valid offset value are respectively set to 8 bits, 8 bits, 32 bits and 9 bits in the binary system. Through the description below, one person having ordinary skill in the art can understand that the concept of the present invention is not limited to the above exemplary conditions.

In the decoding method of the present invention, a stop-fetching flag $F_{stop}$ is set to an enabled status (e.g., bit "1") or a disabled status (e.g., bit "0") according to at least one stop-fetching criterion. For example, the at least one stop-fetching criterion may include whether the offset shift value is smaller than a predetermined upper limit of the offset shift value N, which is greater than zero and smaller than an upper limit of a range shift value. For the range shift value having a length of 8 bits, the upper limit of the range shift value is equal to 255, and the upper limit of the offset shift N may be any positive integer between 1 and 254. When the offset shift value is smaller than the upper limit N, the stop-fetching flag $F_{stop}$ is set to the disabled status. When the offset shift value is greater than or equal to the upper limit N, the stop-fetching flag $F_{stop}$ is set to the enabled status.

For example, the at least one stop-fetching criterion may include whether an external bandwidth is higher than a bandwidth threshold. The external bandwidth, an overall index, is corresponding to a time needed for the offset fetching procedures to obtain a subsequent offset from an external environment (e.g., a bus, an external memory or a front-end circuit). A larger external bandwidth indicates that the offset fetching procedure requires a shorter period of time to obtain the subsequent offset, and a narrower external bandwidth indicates that the offset fetching procedure requires a longer period to obtain the offset. When the external bandwidth is larger than the bandwidth threshold, the stop-fetching flag $F_{stop}$ is set to the disabled status. When the external bandwidth is smaller than or equal to the bandwidth threshold, the stop-fetching flag $F_{stop}$ is set to the enabled status.

For another example, the at least one stop-fetching criterion may include whether a remaining shift value is smaller than an upper limit of the remaining shift value, where the remaining shift value is generated by subtracting the range shift value from the offset shift value. When the remaining shift value is smaller than the upper limit, the stop-fetching flag $F_{stop}$ is set to the disabled status. When the remaining shift value is greater than or equal to the upper limit, the stop-fetching flag $F_{stop}$ is set to the enabled status.

It should be noted that, the scope of the present invention is not limited to the exemplary stop-fetching criteria described above. The decoding method of the present invention may adopt only one stop-fetching criterion, or may concurrently consider multiple stop-fetching criteria. In one embodiment, when the at least one stop-fetching criterion may be plural, the stop-fetching flag $F_{stop}$ is set to the enabled status given that any one of the plurality of stop-fetching criteria is established.

Figure 4:
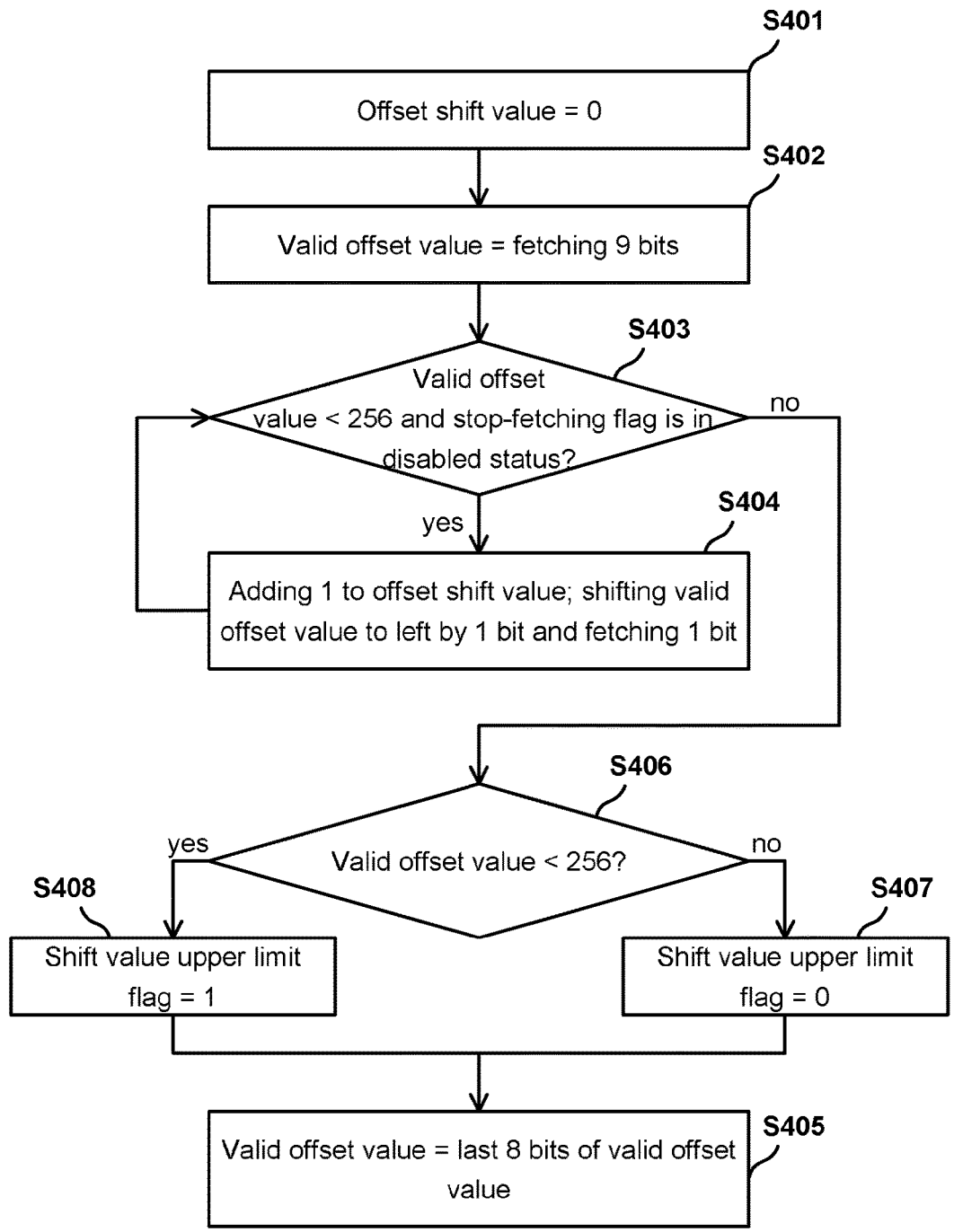
FIG. 4 is a flowchart of an initialization procedure of an offset shift value/valid offset value according to an embodiment of the present invention.

In the embodiment, an initialization procedure of the offset shift value/valid offset value that an arithmetic coding engine of an AVS receiving end in the decoding process is different from the known art. FIG. 4 shows an initialization procedure of an offset shift value/valid offset value of the embodiment. In step S401, the offset shift value is set to 0. In step S402, a 9-bit offset is fetched to serve as the valid offset value. In step S403, it is determined whether the valid offset value is smaller than 256 as well as whether the stop-fetching flag $F_{stop}$ is in the disabled status ($F_{stop}$=0). The value 256 compared with the valid offset value may be regarded as a threshold. When the valid offset value is smaller than 256, it means that a most significant bit (MSB) of the valid offset value is "0". When a determination result of step S403 is affirmative, step S404 is performed to shift the valid offset value to the left and a subsequent bit is fetched. Correspondingly, the offset shift value is added by 1. Step S403 is then iterated until the determination result in step S403 is negative. When the determination result of step S403 is negative (the stop-fetching flag $F_{stop}$ may be in the enabled status ($F_{stop}$=1), or the valid offset value may be greater than 256), the offset fetching procedure represented by steps S403 and S404 is terminated. In step S406, it is determined whether the valid offset value is greater than or equal to 256. When a determination result of step S406 is affirmative, the flow proceeds to step S407 where a shift value upper limit flag is set to a first status ("0" in this example). Otherwise, the flow proceeds to step S408 where the shift value upper limit flag is set to a second status ("1" in this example). In step S405, the valid offset value is set to equal to last 8 bits (omitting the MSB) of the current valid offset value.

In an exemplary situation where the valid offset value fetched in step S402 is 000000001 and the upper limit of the offset shift value N is equal to 4, steps S403 and S404 are iterated for four times. Thus, the offset shift value is accumulated to 4, the stop-fetching flag $F_{stop}$ turns into the enabled status ($F_{stop}$=1), which leads the determination result of step S403 to become negative. Under such conditions, the valid offset value becomes 00001XXXX, where the symbol X represents "1" or "0". This valid offset value renders the determination result of step S406 to be negative, and the shift value upper limit flag is set to "1".

In an exemplary situation where the valid offset value fetched in step S402 is 001001101 and the upper limit of the offset shift value N is equal to 4, steps S403 and S404 are iterated twice. Thus, the valid offset value is adjusted to 1001101XX, and the determination result of step S403 is then negative. Under such conditions, the offset shift value is only 2, which does not yet reach the upper limit N. It means that the stop-fetching flag $F_{stop}$ is still in the disabled status ($F_{stop}$=0). The reason for the negative determination result in step S403 is due to the adjusted valid offset value that is already over 256, and the shift value upper limit flag is thus set to 0.

It should be noted that, in the embodiments of the present invention, the stop-fetching flag $F_{stop}$ may be designed to change immediately based on a condition change in the stop-fetching criteria. That is to say, refreshing of the status of the stop-fetching flag $F_{stop}$ is time-independent from the sequences of performing steps S401 to S405. If the status of the stop-fetching flag $F_{stop}$ is changed during the process of iterating steps S403 and S404, the determination result of step S403 of the following round may be affected.

It is seen from the above description that, by changing the status of the stop-fetching flag $F_{stop}$, an ending time of the offset fetching procedure can be controlled. In the situation where the stop-fetching criterion includes whether the offset shift value is smaller than the upper limit of the offset shift value N, when the offset shift value reaches the upper limit of the range shift value, the offset fetching procedure ends as the stop-fetching flag $F_{stop}$ enters the enabled status. In other words, the upper limit of the offset shift value N is capable of restraining the offset shift value from not being equal to or exceeding the upper limit of the range shift value. Therefore, it is impossible that the offset shift value be accumulated over 254. Hence, the possibility that an excessively high offset shift value causes a collapsed decoding process in the initialization procedure of the offset shift value/valid offset value is eliminated.

As previously stated, if the offset shift value does not exceed 254, the range shift value can then gradually catch up with the offset shift value through step S202, such that the comparison basis for the valid offset value and the valid range value can be kept consistent. After the range shift value catches up with or exceeds the offset shift value, given the decoding result is the LPS, the range shift value and the offset shift value will be reset to zero and re-accumulated (referring to steps S514 and S515 in FIG. 5(B)). An advantage of the above approach is that, the criterion of adding the upper limit of the offset shift value N does not pose an undesirable effect on the accuracy of the decoding result; the only difference is that a longer period that the original range shift value utilizes to catch up with the offset shift value is divided into multiple shorter periods.

From practical perspectives, by limiting the offset shift value to a smaller range, additional advantages can be provided. In an exemplary situation where the upper limit of the offset shift value N is set to 4, a counter that accumulates the offset shift value is required to only accumulate to a value of 4 instead of to ($2^{32}$−1). As such, hardware costs of the counter can be greatly reduced.

Further, by adding the criterion of the upper limit of the offset shift value N, the overall decoding process can be prevented from staying for too long at steps for the offset fetching procedure. Thus, if the AVS receiving end adopts a pipelined architecture for processing input signals, by exercising the concept of adding the upper limit of the offset shift value of the present invention, the variation in the output interval of the decoding result can be decreased to further enhance the overall efficiency of the AVS receiving end.

In one embodiment, in a situation where the stop-fetching criterion includes whether the external bandwidth is larger than the bandwidth threshold, the existence of the stop-fetching flag $F_{stop}$ of the criterion is capable of preventing the offset fetching procedure from staying at step S404 due to limitations of the external environment. By adding this limitation, given an insufficient external bandwidth, the stop-fetching flag $F_{stop}$ enters the enabled status to end the offset fetching procedure earlier, compared to when e the offset fetching procedure may originally be extremely lengthy without this limitation. Such approach also enhances the overall efficiency of the AVS decoding end. In practice, the bandwidth threshold may be determined by a designer of the AVS decoding end according to software/hardware conditions, and is not limited to a specific value.

In another embodiment of the present invention, step S404 may be modified to "accumulating P to the offset shift value, and shifting the valid offset value to the left by P bits and fetching other P bits", where P is a positive integer greater than 1. In other words, when provided with abundant software/hardware resources, the offset fetching procedure may be designed to concurrently pre-fetch multiple subsequent offsets. In the embodiment, the stop-fetching criterion includes whether a remaining shift value resulted from subtracting the range shift value from the offset shift value is smaller than an upper limit of the remaining shift value. Such criterion helps the average fetching performance. More specifically, if the remaining shift value is greater than or equal to the upper limit, it means that the number of subsequent offsets that the decoding procedure needs for the decoding basis is quite sufficient, and thus there is no need for more subsequent offsets to be fetched temporarily. In contrast, when the remaining shift value is smaller than the upper limit, it means that continuing fetching the subsequent offsets is appropriate. Therefore, under this condition, the stop-fetching flag $F_{stop}$ is set to the disabled status. In practice, the upper limit of the remaining shift value may similarly be determined by a designer of the AVS decoding end according to software/hardware conditions, and is not limited to a specific value.

Figure 5A:
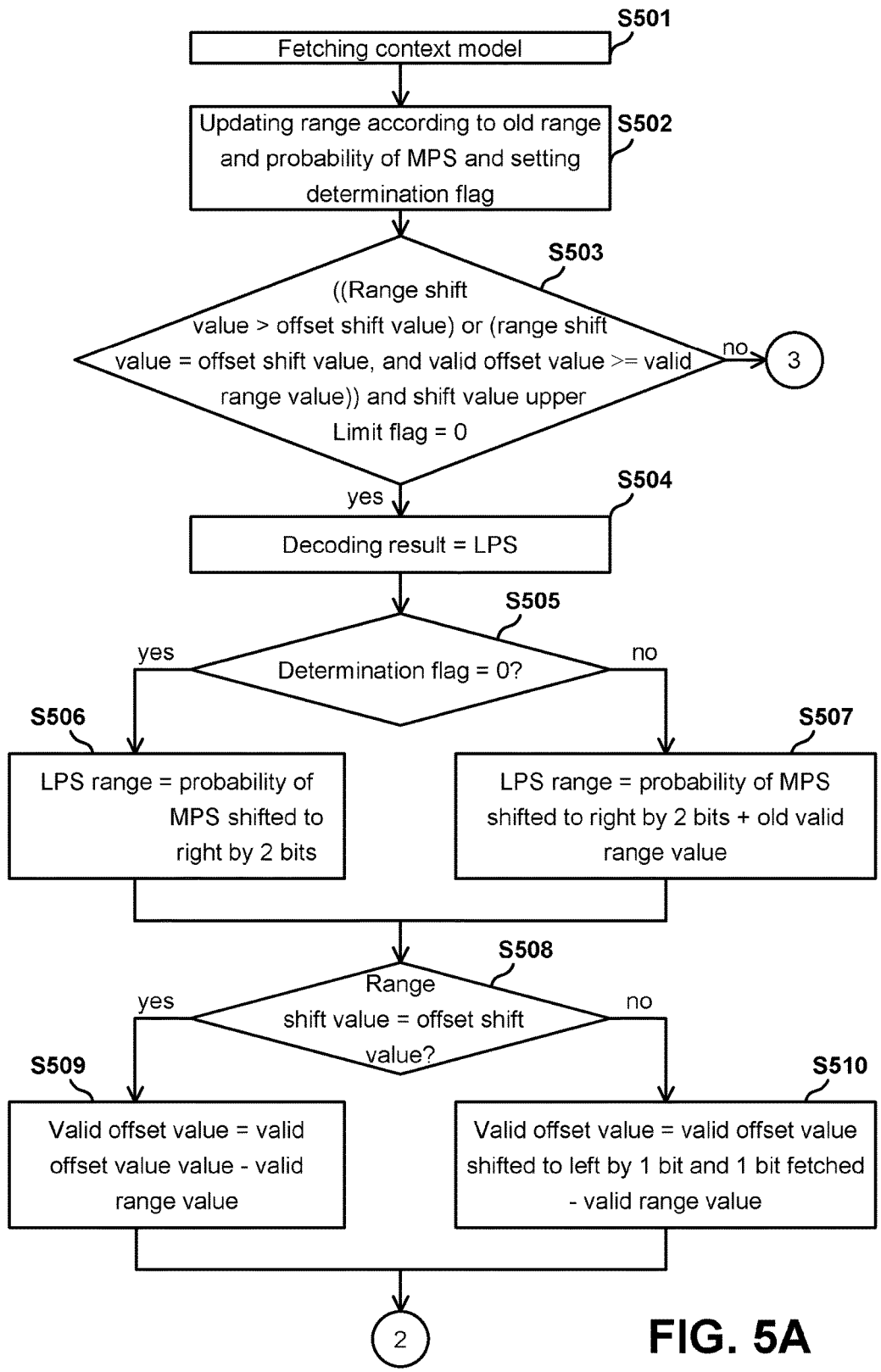
FIG. 5(A) and FIG. 5(B) are a flowchart of a main decoding procedure according to an embodiment of the present invention.
Figure 5B:
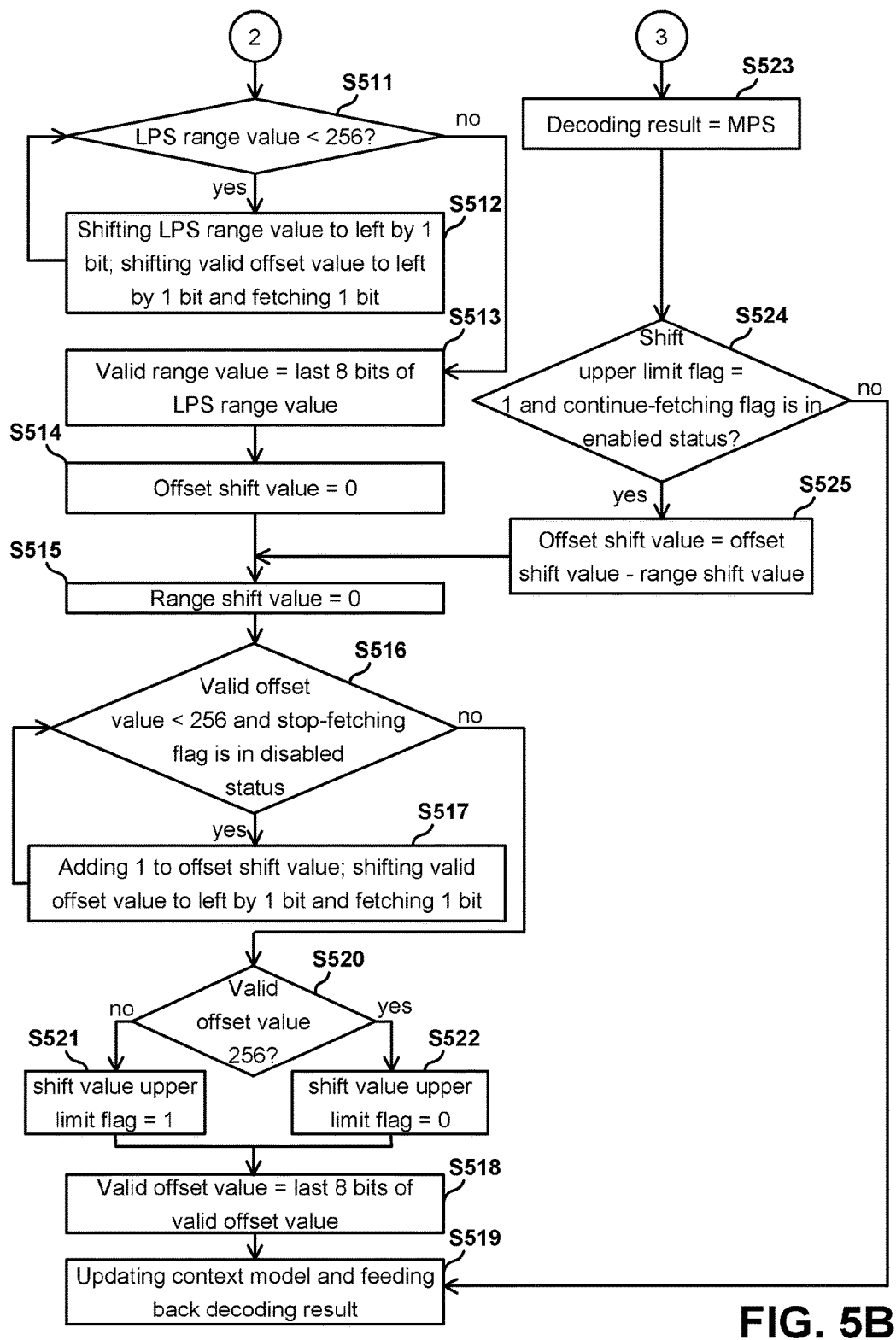

FIG. 5(A) and FIG. 5(B) show a flowchart of a main decoding procedure according to an embodiment of the present invention. Comparing FIGS. 5(A) and 5(B) with FIGS. 2(A) and 2(B), it is observed that steps S501, S502, S505 to S515, S518 and S519 are known art, which shall be omitted herein. In summary, step S501 is for fetching a context model; step S502 is for updating a range according to an old range and the probability of an MSP, and setting a determination flag; steps S505 to S507 are for determining an LPS range value according to the determination flag; steps S508 to S510 are for updating the valid offset value according to the range shift value, the offset shift value, the valid range value and the valid offset value; steps S511 to S515 are for selectively renormalizing the LPS range value; step S518 is for setting the valid offset value to the last 8 bits of the valid offset value (omitting the MSB); and step S519 is for updating the context model and feeding back the decoding result.

Step S503 in FIG. 5(A) may be divided into three determination equations: 1) whether the range shift value is greater than the offset shift value; 2) whether the range shift value is equal to the offset shift value as well as whether the valid offset value is greater than or equal to the valid range value; and 3) whether the shift value upper limit flag is in the first status ("0" in this example). When a determination result of either of the first two determination equations is affirmative and a determination result of the third determination equation is also affirmative, the flow proceeds to step S504 where the decoding result is determined to be an LPS. In contrast, when both of the determination results of the first two determination equations are negative, or the determination result of the third determination equation is negative, the flow proceeds to step S523 where the decoding result is determined to be an MSP.

Offset fetching steps S516 and S517 and shift value upper limit flag setting steps S520 to S522 in FIG. 5(B) are identical to steps S403 and S404 and steps S406 to S408 in FIG. 4. Similarly, after the stop-fetching flag $F_{stop}$ changes from the disabled status to the enabled status, the offset fetching procedure is terminated, thereby preventing the issues of the prior art.

In addition to the stop-fetching flag $F_{stop}$, the above decoding process may also adopt a continue-fetching flag $F_{cont}$ for indicating a situation suitable for an offset fetching procedure. Similarly, according to at least one continue-fetching criterion, the continue-fetching flag $F_{cont}$ is set to an enabled status or a disabled status. For example, the at least one continue-fetching criterion may include whether the range shift value is smaller than the foregoing upper limit of the offset shift value N. When the range shift value is smaller than the upper value N, the continue-fetching flag $F_{cont}$ is set to the enabled status. When the range shift value is greater than or equal to the upper value N, the continue-fetching flag $F_{cont}$ is set to the disabled status.

For example, the at least one continue-fetching criterion may include whether a subsequent data processing unit is in a busy status. The so-called subsequent processing unit may include a decoder that operates based on a shift value obtained from the offset fetching procedure. If the AVS receiving end adopts a pipelined architecture for processing input signals, the subsequent data processing unit may further include a signal processing circuit that is next-stage to the decoder. In practice, the offset fetching procedure and the decoding procedure may operate in parallel. When the subsequent data processing unit is in the busy status, even the termination of the offset fetching procedure does not promote or enhance the overall data processing performance of the AVS receiving end, and thus the continue-fetching flag $F_{cont}$ is set to the enabled status. In contrast, when the subsequent data processing unit is not in the busy status, the continue-fetching flag $F_{cont}$ is set to the disabled status. It should be noted that, the foregoing busy status may be defined by a designer of the AVS decoding end.

For another example, the at least one continue-fetching criterion may include whether a remaining shift value resulted from subtracting the range shift value from the offset shift value is smaller than a lower limit of the remaining shift value. In practice, the decoder may be designed to concurrently generate multiple decoding results. When the remaining shift value is smaller than the lower limit of the remaining shift value, it means that the number of the fetched offsets that the decoding procedure needs for the decoding basis may be insufficient, and thus the continue-fetching flag $F_{cont}$ is set to the enabled status. In contrast, when the remaining shift value is greater than or equal to the lower limit, the continue-fetching flag $F_{cont}$ is set to the disabled status. In practice, the lower limit of the remaining shift value may be determined by a designer of the AVS decoding end according to software/hardware conditions, and is not limited to a specific value.

It should be noted that, the scope of the present invention is not limited to the exemplary continue-fetching criteria described above. The decoding method of the present invention may adopt only one continue-fetching criterion, or may concurrently consider multiple continue-fetching criteria. In one embodiment where the at least one continue-fetching criterion may be plural, the continue-fetching flag $F_{cont}$ is set to the enabled status given that any one of the plurality of continue-fetching criteria is established.

Figure 2B:
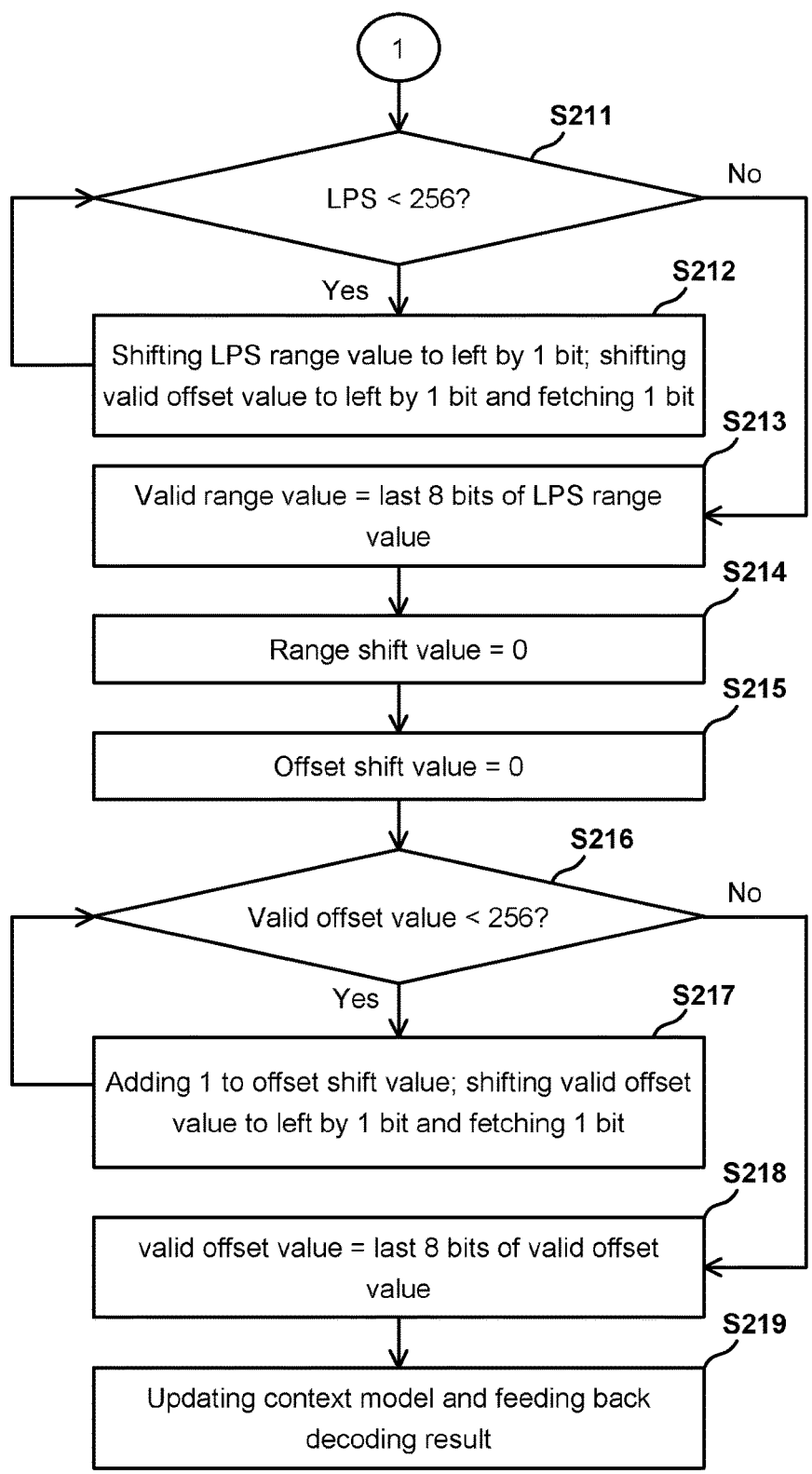
Figure 3A:
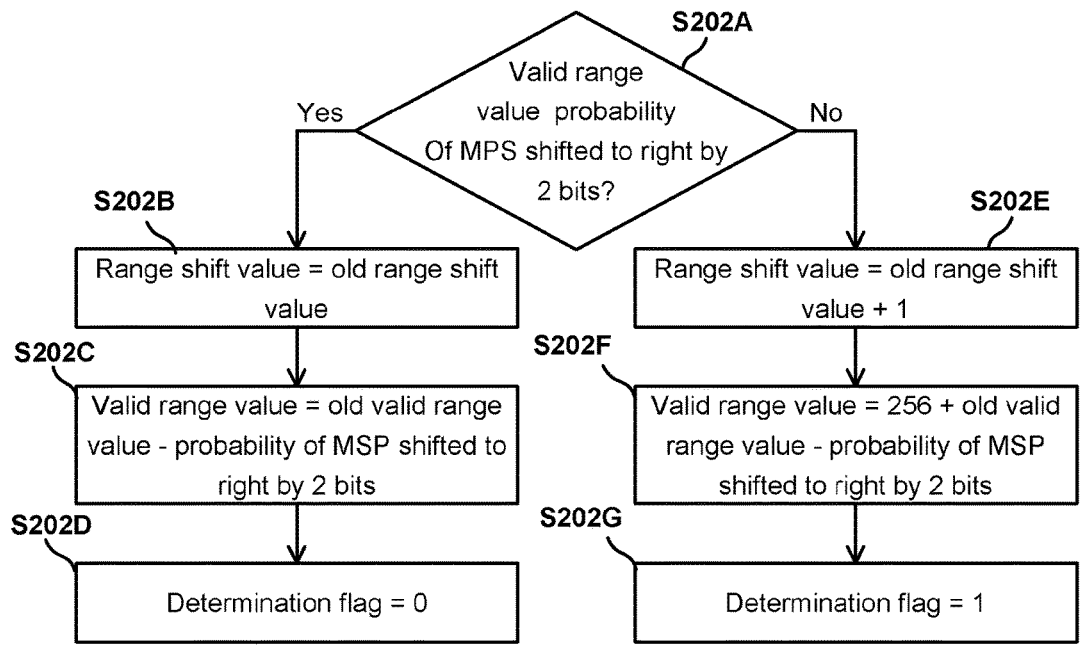
FIG. 3(A) is a flowchart of updating a range and determining a flag in a AVS decoding method in the prior art.
Figure 3B:
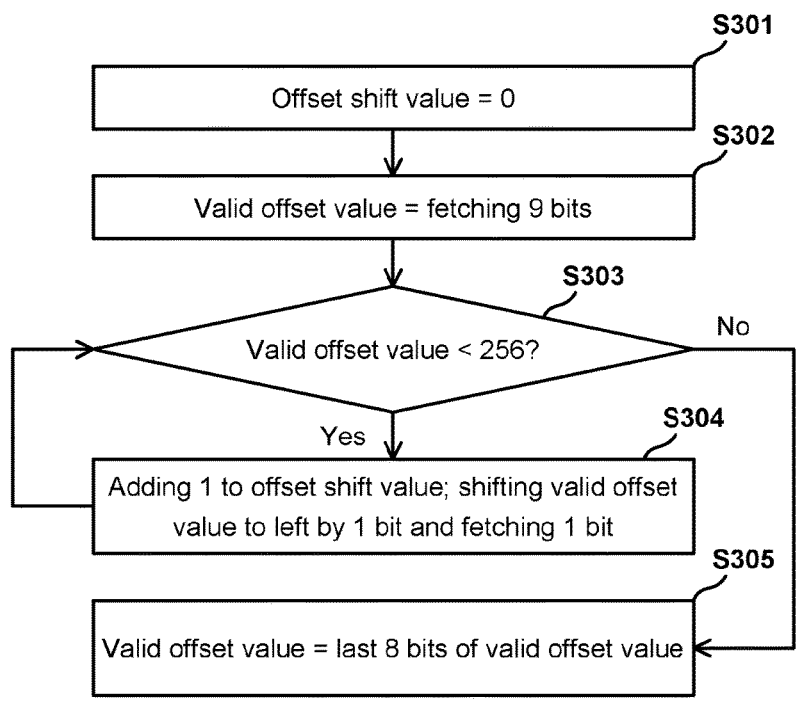
FIG. 3(B) is a flowchart of an initialization procedure of an offset shift value/valid offset value in the prior art.

It is seen from FIG. 2(A) and FIG. 2(B) that, according to specifications of current AVS documentations, the offset fetching step (steps S216 and S217) is arranged only after the step where the decoding result is determined to be an LPS (step S204). As shown in FIG. 5(B), in one embodiment, when it is determined that the decoding result is an MPS (step S523), step S524 of determining whether both criteria of whether the shift value upper limit flag=1 and whether the continue-fetching flag $F_{cont}$ is in the enabled status are simultaneously established. When a determination result of step S524 is negative, the process directly proceeds to step S519 of updating the context model and feeding back the decoding result. When the determination result of step S524 is affirmative, in step S525, the offset shift value is updated to equal to a result of subtracting the range shift value from the original offset shift value. Steps S515 to S522 are then performed. That is to say, when the determination result of step S524 is affirmative, even when it is determined that the decoding result is determined to be an MSP, the offset fetching procedure is still performed.

In a situation where the continue-fetching criterion includes whether the subsequent data processing unit is in the busy status, by adopting the continue-fetching flag $F_{cont}$, a period spent for waiting for the subsequent data processing unit can be effectively utilized without degrading the overall data processing performance of the AVS receiving end. In a situation where the continue-fetching criterion includes whether the remaining shift value is smaller than the lower limit of the remaining shift value, by adopting the continue-fetching flag $F_{cont}$, an issue of not reaching the maximum performance due to an insufficient number of offsets available to the decoder can be eliminated.

One person having ordinary skill in the art can understand that, the sequences of some of the steps or combinations of determination logics in the steps can be equivalently exchanged, and an overall effect of the decoding method can remain unaffected by such modifications.

Figure 6:
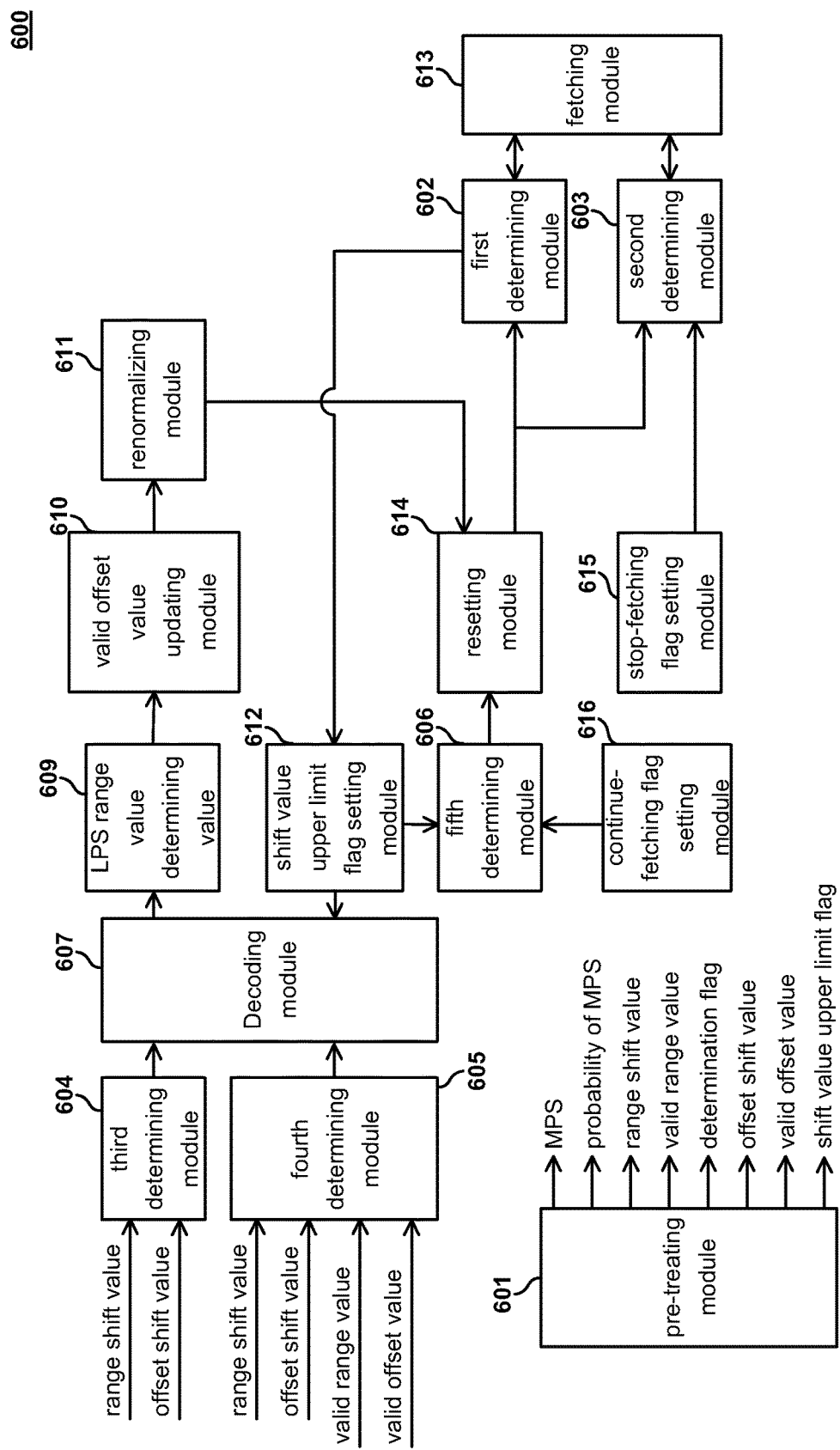
FIG. 6 is a function block diagram of a decoding apparatus according to an embodiment of the present invention.

According to another embodiment of the present invention, a decoding apparatus for an AVS system is provided. FIG. 6 shows a function block diagram of the decoding apparatus. Referring to FIG. 6, a decoding apparatus 600 includes a pre-treating module 601, a first determining module 602 to a fifth determining module 606, a decoding module 607, an LPS range value determining module 609, an valid offset value updating module 610, a renormalizing module 611, a shift value upper limit flag setting module 612, a fetching module 613, a resetting module 614, a stop-fetching flag setting module 615, and a continue-fetching flag setting module 616.

The first determining module 602 determines whether a valid offset value is smaller than a threshold. In an offset fetching procedure, when the first determining module 602 determines that the valid offset value is greater than or equal to the threshold, the shift value upper limit flag module 612 sets a shift value upper limit flag to a first status (e.g., "0"). In contrast, in the offset fetching procedure, when the first determining module 602 determines that the valid offset value is smaller than the threshold, the shift value upper limit flag setting module 612 sets the shift value upper limit flag to a second status (e.g., "1").

The stop-fetching flag setting module 615 sets a stop-fetching flag to an enabled status or a disabled status according to at least one stop-fetching criterion. The continue-fetching flag setting module 616 sets a continue-fetching flag to an enabled status or a disabled status according to at least one continue-fetching criterion.

The pre-treating module 601 performs an initialization procedure of an offset shift value and the valid offset value (corresponding to steps S401 to S408), fetching a context module (corresponding to step S501), updating the range according to an old range and the probability of an MPS and setting a determination flag (corresponding to step S502). The third determining module 604 determines whether the range shift value is greater than the offset shift value (corresponding to step S503). The fourth determining module 505 determines whether the range shift value is equal to the offset shift value and whether the valid offset value is greater than or equal to the valid range value (also corresponding to step S503). When a determination result of either of the third determining module 604 and the fourth determining module 605 is affirmative, and the shift value upper limit flag set by the shift value upper limit flag setting module 612 is in the first status, the decoding module 607 determines that the decoding result is an LPS (corresponding to step S504). In contrast, when the shift value upper limit flag set by the shift value upper limit flag setting module 612 is in the second status, or the determination results of both of the third determining module 604 and the fourth determining module 605 are negative, the decoding module 607 determines that the decoding result is an MPS (corresponding to step S523).

After determining that the decoding result is an LPS, the LPS range value determining module 609 determines an LPS range value (corresponding to step S505 to S507), the valid offset value updating module 610 updates the valid offset value according to the range shift value, the offset shift value, the valid range value and the valid offset value (corresponding to steps S508 to S510), and the renormalizing module 611 selectively renormalizes the LPS range value (corresponding to steps S511 to S513). Next, the resetting module 613 sets both of the offset shift value and the range shift value to 0 (corresponding to steps S514 and S515).

In the later offset fetching procedure, the first determining module 602 determines whether the valid offset value is smaller than the threshold (corresponding to the first part of step S516). The second determining module 603 determines whether the stop-fetching flag is in the disabled status (corresponding to the second part of step S515). When determination results of both of the first determining module 602 and the second determining module 603 are affirmative, the fetching module 613 fetches a subsequent bit for the valid offset value, correspondingly increases the offset shift value, and controls the first determining module 602 and the second determining module 603 to perform respective determination procedures. When the determination results of both of the first determining module 602 and the second determining module 603 are negative, the fetching module 613 terminates the offset fetching procedure.

When the determination result indicates an MPS, the fifth determining module 606 determines whether the shift value upper limit flag is set to the second status, and the whether the continue-fetching flag is in the enabled status (corresponding to step S524). When a determination result of the fifth determining module 606 is affirmative, the resetting module 614 updates the offset shift value to be equal to a result of subtracting the range shift value from the original offset shift value (corresponding to step S525), sets the range shift value to 0 (corresponding to step S515), and controls the first determining module 602 and the second determining module 603 to perform respective determination procedures (corresponding to step S516).

In practice, the above modules may be implemented by circuits such as buffers, logic gates, comparators, shifters and adders. Possible operation variations are known to one person having ordinary skill in the art, and shall be omitted herein. Various operations and modifications in the description associated with the process of the decoding method in FIGS. 4, 5(A) and 5(B) are applicable to the decoding apparatus 600, and shall also be omitted herein. It should be noted that, in the function blocks, circuits that do not operate simultaneously and have similar functions may be designed to share hardware resources to reduce implementation costs.

According to another embodiment of the present invention, a non-transient computer-readable storage medium for an AVS system is provided. The non-transient computer-readable storage medium stores a program code readable and executable by a processor. The program code, associated with a decoding procedure, includes: a first program code, configured to control the processor to provide an upper limit of an offset shift value, wherein the upper limit is greater than zero and smaller than an upper limit of a range shift value; a second program code, configured to control the processor to determine whether a valid offset value is smaller than a threshold and whether an offset shift value is smaller than the upper limit of the offset shift value in an offset fetching procedure; a third program code, configured to control the processor to fetch a subsequent bit for the valid offset value, to correspondingly increase the offset shift value, and to re-execute the second program code when a determination result after executing the second program code is affirmative; a fourth program code, configured to control the processor to terminate the offset fetching procedure when the determination result after executing the second program code is negative; and a fifth program code, configured to determine whether a decoding result is an LPS or an MPS after the offset fetching procedure is terminated.

In practice, the computer-readable medium may be any type of non-transient medium storing commands that can be read, decoded and executed by a processor. The non-transient medium includes electronic, magnetic and optical storage devices. For example, the non-transient computer-readable medium includes: ROM, RAM, and other electronic storage devices, CD-ROM, DVD and other optical storage device, magnetic tapes, soft discs, hard discs, and other magnetic storage devices. The processor commands may realize the present invention through various program languages. Further, operation details in the description associated with the process of the decoding method in FIGS. 4, 5(A) and 5(B) are applicable to the computer-readable medium, and shall be omitted herein.

It should be noted that, in a situation where the stop-fetching flag $F_{stop}$ is not adopted in the offset fetching procedure, according to the decoding method, decoding apparatus and non-transient computer-readable storage medium of the present invention, it can still be determined whether the offset fetching procedure is to be continued according to the continue-fetching flag $F_{cont}$ after it is determined that a decoding result is an MPS. In other words, the continue-fetching flag $F_{cont}$ may be independent from the stop-fetching flag $F_{stop}$ to provide the foregoing effects.

As disclosed, a decoding method and a decoding apparatus for an AVS system are provided. By appropriately setting a stop-fetching flag for an offset fetching procedure, the decoding method and decoding apparatus of the present invention are capable of effectively preventing an offset shift value from being higher than a range shift value to further eliminate the issue of a collapsed decoding process. Further, with the stop-fetching flag, the decoding method and decoding apparatus of the present invention are also capable of preventing the issue of the decoding procedure staying at a pre-fetching step as in the prior art, thereby enhancing the overall operation efficiency of an AVS receiving end. Not only the approach of the present poses no undesirable effect on the decoding accuracy but also greatly reduces hardware costs. It should be noted that, when adopting the decoding method and decoding apparatus of the present invention, the decoding result outputted by an AVS encoding end need not apply an associated preventive criterion (e.g., a criterion that prohibits more than 254 bit "0" from occurring in the offset) on an outputted encoding result, i.e., the size of a buffer for storing the range shift value in an AVS decoding end need not be modified.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A decoding method for an audio video coding standard (AVS) system, for decoding encoded audio/video data, decoding method comprising:
   a) setting a stop-fetching flag to an enabled status or a disabled status according to at least one stop-fetching criterion, wherein the at least one stop-fetching criterion comprises:
   setting the stop-fetching flag to the disabled status when a remaining shift value obtained by subtracting a range shift value from the offset shift value is smaller than an upper limit of the remaining shift value; and
   setting the stop-fetching flag to the enabled status when the remaining shift value is greater than or equal to the upper limit of the remaining shift value;
   b) in an offset fetching procedure, determining whether a valid offset value is smaller than a threshold and whether the stop-fetching flag is in the disabled status;
   c) when a determination result of step (b) is affirmative, fetching a subsequent bit for the valid offset value, correspondingly increasing an offset shift value, and iterating step (b);
   d) when the determination result of step (b) is negative, terminating the offset fetching procedure; and
   e) after the offset fetching procedure is terminated, determining whether a decoding result is a least probable symbol (LPS) or a most probable symbol (MPS).

2. The decoding method according to claim 1, wherein the at least one stop-fetching criterion comprises: when an external bandwidth is higher than a bandwidth threshold, the stop-fetching flag is set to the disabled status; when the external bandwidth is lower than the bandwidth threshold, the stop-fetching flag is set to the enabled status, and the external bandwidth is associated with time need for the offset fetching procedure to obtain the subsequent bit from an external environment.

3. The decoding method according to claim 1, wherein the at least one stop-fetching criterion comprises: when the offset shift value is smaller than an upper limit of the offset shift value, the stop-fetching flag is set to the disabled status; when the offset shift value is greater than or equal to the upper limit of the offset shift value, the stop-fetching flag is set to the enabled status.

4. The decoding method according to claim 3, between steps (d) and (e), further comprising:
   f1) determining whether the valid offset value is greater than the threshold;
   f2) when a determination result of step (f1) is affirmative, setting a shift value upper limit flag to a first status; and
   f3) when the determination result of step (f1) is negative, setting the shift value upper limit flag to a second status.

5. The decoding method according to claim 4, wherein step (e) comprises:
   e1) determining whether a range shift value is greater than the offset shift value;
   e2) determining whether the range shift value is equal to the offset shift value and whether the valid offset value is greater than or equal to a valid range value;

e3) determining whether the shift value upper limit flag is in the first status; and e4) when a determination result of step (e1) or of step (e2) is affirmative, and a determination result of step (e3) is also affirmative, determining the decoding result as the LPS.

6. The decoding method according to claim 5, after step (e4), further comprising:
determining an LPS range value according to a determination flag;
updating the valid offset value according to the range shift value, the offset shift value, the valid range value and the valid offset value;
selectively renormalizing the LPS range value; and
setting both of the offset shift value and the range shift value to zero, and iterating step (b).

7. The decoding method according to claim 5, further comprising:
e5) when the determination result of step (e3) is negative, or the determination results of both of step (e1) and step (e2) are negative, determining the decoding result as the MPS.

8. The decoding method according to claim 7, further comprising:
setting a continue-fetching flag to an enabled status or a disabled status according to at least one continue-fetching criterion;
after step (e5), the decoding method further comprising:
e6) determining whether the shift value upper limit flag is in the second status and whether the continue-fetching flag is in the enabled status; and
e7) when a determination result of step (e6) is affirmative, updating the offset shift value to be equal to the a result of subtracting the range shift value from the offset shift value, updating the range shift value to zero, and iterating step (b).

9. The decoding method according to claim 8, wherein the at least one continue-fetching criterion comprises: when the range shift value is smaller than an upper limit of the offset shift vale, the continue-fetching flag is set to the enabled status; when the range shift value is greater than or equal to the upper limit of the offset shift value, the continue-fetching flag is set to the disabled status.

10. The decoding method according to claim 8, wherein the at least one continue-fetching criterion comprises: when the remaining shift value is smaller than the lower limit of the remaining shift value, the continue-fetching flag is in the enabled status; and
when the remaining shift value is greater than or equal to the lower limit of the remaining shift value, the continue-fetching flag is in the disabled status.

11. The decoding method according to claim 8, wherein the continue-fetching criterion comprises: when a subsequent data processing unit is in a busy status, the continue-fetching flag is in the enabled status; and
when the subsequent data processing unit is not in the busy status, the continue-fetching flag is in the disabled status.

12. The decoding method according to claim 8, wherein when the at least one continue-fetching criterion are plural, the continue-fetching flag is set to the enabled status given any one of the continue-fetching criteria is established.

13. The decoding method according to claim 1, wherein when the at least one stop-fetching criterion are plural, the stop-fetching flag is set to the enabled status given any one of the stop-fetching criteria is established.

14. The decoding method according to claim 1, wherein the offset fetching procedure is comprised in an initialization procedure of the offset shift value and the valid offset value.

15. A decoding apparatus for an audio video standard (AVS) system, configured to decode encoded audio/video data, the decoding apparatus comprising:
a stop-fetching flag setting module, configured to set a stop-fetching flag to an enabled status or a disabled status according to at least one stop-fetching constraint;
a first determining module, configured to determine whether an valid offset value is smaller than a threshold in an offset fetching procedure;
a second determining module, configured to determine whether the stop-fetching flag is in the disabled status;
a fetching module, when determination results of both of the first determining module and the second determining module are affirmative, configured to fetch a subsequent bit for the offset effective value, to correspondingly increase an offset shift value, and to control the first determining module and the second determining module to perform respective determinations again; when the determination results of both of the first determining module and the second determining module are negative, configured to terminate the offset fetching procedure; and
a decoding module, configured to determine whether a decoding result is a least probable symbol (LPS) or a most probable symbol (MPS) after the offset fetching procedure is terminated;
wherein the at least one stop-fetching criterion determines whether a remaining shift value is smaller than an upper limit of a remaining shift value; the stop-fetching flag setting module generates the remaining shift value by subtracting a range shift value from the offset shift value; when the remaining shift value is smaller than the upper limit of the remaining shift value, the stop-fetching flag setting module sets the stop-fetching flag to the disabled status; when the remaining shift value is greater than or equal to the upper limit of the remaining shift value, the stop-fetching flag setting module sets the stop-fetching flag to the enabled status.

16. The decoding apparatus according to claim 15, wherein the at least one stop-fetching criterion comprises whether an external bandwidth is higher than a bandwidth threshold; when the external bandwidth is higher than the threshold, the stop-fetching flag is set to the disabled status; when the external bandwidth is lower than the bandwidth threshold, the stop-fetching flag is set to the enabled status; the external bandwidth is associated with a wait time that the offset fetching procedure requires for obtaining the subsequent bit from an external environment.

17. The decoding apparatus according to claim 15, wherein the at least one stop-fetching criterion comprises:
when the offset shift value is smaller than an upper limit of the offset shift value, the stop-fetching flag setting module sets the stop-fetching flag to the disabled status; when the offset shift value is greater than or equal to the offset shift upper limit, the stop-fetching flag setting module sets the stop-fetching flag to the enabled status.

18. The decoding apparatus according to claim 17, further comprising:
a shift value upper limit flag setting module, configured to set a shift value upper limit flag to a first status or a second status according to the determination result of the first determining module.

19. The decoding apparatus according to claim 18, further comprising:

a third determining module, configured to determine whether a range shift value is greater than the offset shift value; and a fourth determining module, configured to determine whether the range shift value is equal to the offset shift value and whether the valid offset value is greater than or equal to a valid range value;

wherein, when a determination result of the third determining module or of the fourth determining module is affirmative, and the shift value upper limit flag is in the first status, the decoding module determines that the decoding result is the LPS.

20. The decoding apparatus according to claim 19, further comprising:

an LPS range value determining module, configured to determine an LPS range value according to a determination flag;

a valid offset value updating module, configured to update the valid offset value according to the range shift value, the offset shift value, the valid range value and the valid offset value;

a renormalizing module, configured to selectively renormalize the LPS range value; and a resetting module, when the decoding module determines that the decoding result is the LPS, after the renormalizing module renormalizes the LPS range value, configured to reset both of the offset shift value and the range shift value to zero.

21. The decoding apparatus according to claim 19, wherein when the shift value upper limit flag is in the second status, or the determination results of both of the third determining module and the fourth determining module are negative, the decoding module determines that the decoding result is the MPS.

22. The decoding apparatus according to claim 21, further comprising:

a continue-fetching flag setting module, configured to set a continue-fetching flag to an enabled status or a disabled status according to at least one continue-fetching criterion;

a fifth determining module, configured to determine whether the shift upper limit flag is in the second status and whether the continue-fetching flag is in the enabled status; and a resetting module, when a determination result of the fifth determining module is affirmative, the resetting module configured to update the offset shift value to be equal to a result of subtracting the range shift value from the offset shift value, to update the range shift value to zero, and to control the first determining module and the second determining module to perform respective determination procedures.

23. The decoding apparatus according to claim 22, wherein the at least one continue-fetching criterion comprises whether the range shift value is smaller than the upper limit of the offset shift value; when the range shift value is smaller than the offset shift value, the continue-fetching flag setting module sets the continue-fetching flag to the enabled status; when the range shift value is greater than or equal to the upper limit of the offset shift value, the continue-fetching flag setting module sets the continue-fetching flag to the disabled status.

24. The decoding apparatus according to claim 22, wherein the at least one continue-fetching criterion comprises whether a remaining shift value is smaller than a lower limit of the remaining shift value; the continue-fetching flag setting module generates the remaining shift value by subtracting the range shift value from the offset shift value; when the remaining shift value is smaller than the lower limit of the remaining shift value, the continue-fetching flag setting module sets the continue-fetching flag to the enabled status; when the remaining shift value is greater than or equal to the lower limit of the remaining shift value, the continue-fetching flag setting module sets the continue-fetching flag to the disabled status.

25. The decoding apparatus according to claim 22, wherein the at least one continue-fetching criterion comprises whether a subsequent data processing unit is in a busy status; when the subsequent data processing unit is in the busy status, the continue-fetching flag setting module sets the continue-fetching flag to the enabled status; when the subsequent data processing unit is not in the busy status, the continue-fetching flag setting module sets the continue-fetching flag to the disabled status.

26. The decoding apparatus according to claim 15, wherein the offset fetching procedure is part of an initialization procedure of the offset shift value and the valid offset value.

27. A decoding method for an AVS system, for decoding encoded audio/video data, the decoding method comprising:

a) in an offset fetching procedure, setting a shift value upper limit flag to a first status or a second status according to a corresponding relationship between an offset shift value and a threshold;

b) setting a continue-fetching flag to an enabled status or a disabled status according to at least one continue-fetching criterion;

c) determining whether a decoding result is an LPS or an MPS;

d) when it is determined that the decoding result is the MPS, determining whether the shift value upper limit flag is in the second status and whether the continue-fetching flag is in the enabled status; and e) when a determination result of step (d) is affirmative, updating the offset shift value to be equal to a result of subtracting a range shift value from the offset shift value, setting the range shift value to zero, and iterating the offset fetching procedure.

28. The decoding method according to claim 27, wherein the at least one continue-fetching criterion comprises whether the range shift value is smaller than an upper limit of the offset shift value; when the range shift value is smaller than the offset shift value, the continue-fetching flag is set to the enabled status;

when the range shift value is greater than or equal to the upper limit of the offset shift value, the continue-fetching flag is set to the disabled status.

29. The decoding method according to claim 27, wherein the at least one continue-fetching criterion comprises whether a remaining shift value generated by subtracting the range shift value from the offset shift value is smaller than a lower limit of the remaining shift value; when the remaining shift value is smaller than the lower limit of the remaining shift, the continue-fetching flag is set to the enabled status; when the remaining shift value is greater than or equal to the lower limit of the remaining shift value, the continue-fetching flag is set to the disabled status.

30. The decoding method according to claim 27, wherein the continue-fetching criterion comprises whether a subsequent data processing unit is in a busy status; when the subsequent data processing unit is in the busy status, the continue-fetching flag is set to the enabled status; when the subsequent data processing unit is not in the busy status, the continue-fetching flag is set to the disabled status.

31. A decoding apparatus for an AVS system, configured to decode encoded audio/video data, the decoding apparatus comprising:
- a shift upper value limit flag setting module, in an offset fetching procedure, the shift value upper limit flag setting module configured to set a shift value upper limit flag to a first status or a second status according to a corresponding relationship between an offset shift value and a threshold;
- a continue-fetching flag setting module, configured to set a continue-fetching flag to an enabled status or a disabled status according to at least one continue-fetching criterion;
- an offset fetching module, configured to perform the offset fetching procedure;
- a determining module, when it is determined that a decoding result is a most probable symbol(MPS), the determining module configured determine whether the shift value upper limit flag is in the second status and whether the continue-fetching flag is in the enabled status;
- a resetting module, when a determination result of the determining result is affirmative, the resetting module configured to update the offset shift value to be equal to a result of subtracting the range shift value from the offset shift value, to reset the range shift value to zero, and to control the determining module to perform the offset fetching procedure; and
- a decoding module, configured to determine whether the decoding result is a most probable symbol (LPS) or the MPS after the offset fetching procedure is terminated.

32. The decoding apparatus according to claim 31, wherein the at least one continue-fetching comprises whether the range shift value is smaller than an upper limit of the offset shift value; when the range shift value is smaller than the offset shift value, the continue-fetching flag setting module sets the continue-fetching flag to the enabled status; when the range shift value is greater than or equal to the upper limit of the offset shift value, the continue-fetching flag setting module sets the continue-fetching flag to the disabled status.

33. The decoding apparatus according to claim 31, wherein the at least one continue-fetching criterion comprises whether a remaining shift value is smaller than a lower limit of the remaining shift value; the continue-fetching flag setting module generates the remaining shift value by subtracting the range shift value from the offset shift value; when the remaining shift value is smaller than the lower limit of the remaining shift value, the continue-fetching flag setting module sets the continue-fetching flag to the enabled status; when the remaining shift value is greater than or equal to the lower limit of the remaining shift value, the continue-fetching flag setting module sets the continue-fetching flag to the disabled status.

34. The decoding apparatus according to claim 31, wherein the at least one continue-fetching criterion comprises whether a subsequent data processing unit is in a busy status; when the subsequent data processing unit is in the busy status, the continue-fetching flag setting module sets the continue-fetching flag to the enabled status; when the subsequent data processing unit is not in the busy status, the continue-fetching flag setting module sets the continue-fetching flag to the disabled status.

* * * * *